Nov. 1, 1966  R. R. BROWN  3,283,184
DETONATION PICKUP
Filed Nov. 4, 1963
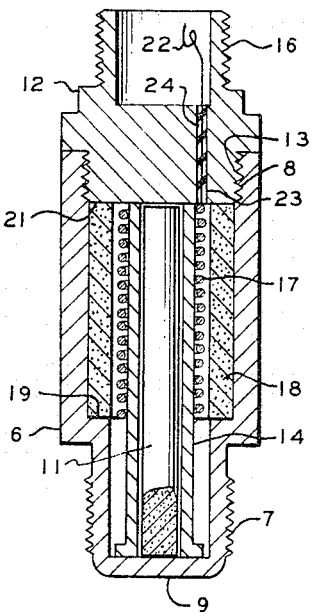
INVENTOR.
R.R. BROWN
BY Young & Quigg
ATTORNEYS

United States Patent Office 3,283,184
Patented Nov. 1, 1966

3,283,184
DETONATION PICKUP
Raymond R. Brown, Bartlesville, Okla., assignor to Phillips Petroleum Company, a corporation of Delaware
Filed Nov. 4, 1963, Ser. No. 321,150
1 Claim. (Cl. 310—26)

This invention relates to detonation meters for use with internal combustion engines. In another aspect it relates to a detonation meter pickup for converting pressure variations in a cylinder of an internal combustion engine to electrical voltages representative thereof. In still another aspect the invention relates to improved method and means for measuring detonation of fuels of 100 octane or more.

In D. R. de Boisblanc, U.S. Patent 2,633,738, issued April 7, 1953, there is disclosed a detonation meter comprising: a pickup for converting pressure variations in a cylinder into electrical voltages; a filter for attenuating undesired noise components, such as those due to valve chatter; an amplifier; and a threshold device for rejecting components in the filtered amplified current of less than a predetermined magnitude. The output of the threshold device consists of voltage waves representative of detonations in the engine cylinder. These voltage waves are amplified and fed to a first pulse generating circuit which transforms each wave into a first exponential pulse which decays exponentially from the peak value of the corresponding voltage wave, and thence to a second pulse generating circuit which transforms the successive exponential pulses into second exponential pulses whose rate of decay is relatively small compared to the first pulse. The output of the second generator is then integrated and fed to a vacuum tube voltmeter which indicates the average intensity of knocking over a preselected period.

For fuels of less than 100 octane, the detonation pulse can be represented as a peak riding upon the crest of the combustion pulse. The threshold device is set to pass only those signals which have a higher amplitude than the combustion pulse, thus blocking the combustion pulse while passing the detonation peak. When the octane number of the test fuel exceeds 100, difficulty is sometimes encountered in obtaining a proper threshold value due to the detonation pulse occurring subsequent to the peak of the combustion pulse to the extent that a threshold sufficiently low to pass the detonation pulse will also pass a portion of the combustion pulse, thus disrupting the accuracy of the knock readings of the instrument.

Heretofore, in measuring detonation in a cylinder of an internal combustion engine, a pickup of the magnetostrictive type has been utilized to provide electrical voltages representative of the cylinder pressure variations. Such pickups ordinarily comprise a rod of magnetostrictive material having a coil wound thereon, this rod being moved responsive to the pressure variations in the cylinder by a diaphragm attached to the rod, this diaphragm either communicating with the interior of the cylinder or being mounted on the engine block adjacent the cylinder. Magnetostrictive pickups of this type provide a reliable measurement of the cylinder pressure variations by the electrical voltages produced, but they have the serious disadvantage that frequent failures occur with resultant expense and inconvenience to the user of the pickup. The most common cause of failure is an open circuit in the coil which is attached directly to the magnetostrictive member and, thus, is subjected to constant mechanical stresses during vibration of the magnetostrictive member.

Considerable heat is necessarily conducted to the pickup casing during operation of the pickup in testing an internal combustion engine. Typical of the pickups commonly used is the magnetostrictive pickup unit disclosed in U.S. Patent 2,269,760 to K. R. Eldredge et al., issued January 13, 1942.

This type of pickup is characterized by increasing insensitivity due to heat aging, because the single magnetized housing loses magnetism as a function of time, the loss being accelerated if the magnet becomes heated. Also, the weld employed in the prior art pickup has experienced failures due to the repetitive mechanical stresses inherent in the vibration of the pickup components.

Accordingly, it is an object of this invention to provide an improved detonation meter.

It is a still further object to provide a magnetostrictive pickup which is reliable in operation, of durable construction meters.

Another object is to provide a detonation meter having increased accuracy for measuring detonation of fuels of 100 octane or higher.

It is another object to provide a novel detonation meter pickup of the magnetostrictive type for use in available struction, and free of premature failure due to heat aging and weld failure.

Another object is to provide a magnetostrictive pickup in which the outer housing does not form part of the magnetic circuit.

Various other objects, aspects and advantages of the invention will become apparent from a study of the disclosure, the drawing and the appended claims to the invention.

According to the present invention, there is provided an improved magnetostrictive pickup unit comprising two permanent magnets one spacedly disposed within the other, a sleeve-shaped element, having an insulated coil wound thereon, disposed in the air gap between the magnets the latter serving as the magnetostrictive element, and an integrated non-magnetic casing for the whole adapted to secure same to an engine cylinder.

Referring now to the drawing in detail, the pickup comprises a generally cylindrical elongated metal casing 6, preferably machined from a substantially nonmagnetic material, such as stainless steel, which is provided, at its lower end, with an externally threaded section 7 of reduced diameter, and at its upper end, with an internally threaded section 8. The external screw threads of section 7 are adapted to fit within a bore in a cylinder of an internal combustion engine so that the lower part of the pickup is in direct communication with the interior of the cylinder under test. Alternatively, section 7 may be provided with a suitable mounting so that it can be attached directly to the engine block, and thereby pick up the pressure variations resulting from operation of the engine.

Section 7 is enclosed by a flat metallic pressure sensitive diaphragm 9, which is formed as an integral part of the casing 6, thus eliminating troublesome welds. This diaphragm portion is adapted to transmit pressure variations in the engine cylinder under test, and this vibration is transmitted to components disposed adjacent the internal surface of said diaphragm which are to be described.

A preferably generally cylindrical permanent magnet 11 is disposed within and axially of said casing, the lower end of magnet 11 being substantially adjacent diaphragm 9.

A fitting 12 of stainless steel, partially threaded on its upper ends, is threadedly secured in its middle portion 13 to threaded section 8 of casing 6. An elongated annular sleeve 14 extends inwardly of said casing and spacedly surrounds bar magnet 11, the lower end of sleeve 14 being adjacent to diaphragm 9 and preferably flanged. Sleeve 14 is formed of a magnetostrictive material, such as a suitable nickel alloy. The flange of sleeve 14 is adjacent to diaphragm 9, and the lower surface of fitting 12 presses against its upper end. The outer end 16 of fitting 12 is externally threaded so that it may be adapted to secure the pickup component to a detonation meter (not shown).

An insulated coil 17 of an annular shape is mounted fixedly on the periphery of sleeve 14, the axis of the mounted coil being perpendicular to the longitudinal axis of casing 6.

A sleeve-shaped permanent magnet 18 is also disposed within the casing and surrounds at least a portion of the coil-wrapped sleeve 14. The coil 17 is disposed in the air gap between the outside surface of sleeve 14 and the inside surface of cylindrical bar magnet 18. Magnet 18 rests on a shoulder 19 provided in the inner surface of casing 6, and is retained in position by the lower surface 21 of fitting 12.

One terminal of coil 17 is connected directly to casing 6 as ground, and the other terminal is connected to a lead 22 which emerges from within the casing via passage means 23 provided in fitting 12. The opening 23 in fitting 6 may be sealed by insulating material 24 to prevent moisture from entering the interior of the casing.

In the operation of the novel pickup, pressure variations within the engine cylinder are transmitted to diaphragm 9, and therethrough to flanged sleeve 14. The resulting stresses set up in magnetostrictive sleeve 14 modify the flux path established by the two magnets, which are poled in opposite directions. This modification of the flux path induces an electromotive force in coil 17. In this manner, an electrical voltage is induced in coil 17 which is representative of the pressure variations adjacent diaphragm 9. Failure of the pickup due to open circuiting of the coil is substantially eliminated or greatly minimized.

The improvements resulting from these changes are:

(1) The electrical output of the pickup component indicates that the detonation spike is increased in size with respect to the combustion pulse typically by about 2:1 This permits easier detection of detonation phenomena, especially at high octane number. It provides an increased range of detonation meter readings for more accurate octane determination without changing the fuel rating.

(2) The detonation spike is less variable in size.

(3) The electrical output is greater due to the use of two magnets.

(4) The cost of machining are reduced since the diaphragm forms an integral part of the housing.

Reasonable variation and modification are possible within the scope of the foregoing disclosure, the drawing and the appended claim to the invention.

I claim:

A detonation pickup, comprising in combination:
an elongated metal casing composed of substantially nonmagnetic material, one end thereof being adapted to be secured to a cylinder of an internal combustion engine, said casing being closed at said one end by a pressure sensitive diaphragm;
a generally cylindrical bar-shaped first permanent magnet disposed axially within said casing having one end adjacent said diaphragm;
an elongated annular sleeve of magnetostrictive material positioned within said casing and surrounding said first magnet, one end of said sleeve being adjacent said diaphragm;
a coil of insulated wire wound on and fixedly mounted to at least a portion of the periphery of said sleeve; and
an annular second permanent magnet disposed within said casing and surrounding at least a portion of the coil-wrapped sleeve, said coil of insulated wire being disposed solely within the air gap between the outside surface of said sleeve and the inside surface of said annular second permanent magnet, said first and second permanent magnets being poled in opposite directions.

References Cited by the Examiner

UNITED STATES PATENTS

| | | | |
|---|---|---|---|
| 2,269,760 | 1/1942 | Eldredge | 310—26 X |
| 2,435,031 | 1/1948 | Burns | 310—26 |
| 2,533,249 | 12/1950 | Henson | 310—25 |
| 2,692,344 | 10/1954 | Van der Burgt et al. | 310—26 |
| 2,886,794 | 5/1959 | Stedman et al. | 340—11 |
| 2,923,367 | 2/1960 | Cox | 181—.5 |
| 2,978,670 | 4/1961 | Peek | 310—26 X |
| 3,070,790 | 12/1962 | Roth | 340—11 X |
| 3,101,422 | 8/1963 | Church et al. | 310—26 |

D. F. DUGGAN, *Assistant Examiner.*

MILTON O. HIRSHFIELD, *Primary Examiner.*